(12) United States Patent
Nemoto et al.

(10) Patent No.: US 7,688,685 B1
(45) Date of Patent: Mar. 30, 2010

(54) MAGNETO-OPTICAL RECORDING DEVICE CAPABLE OF CHANGING THE SHAPES OF HEATING AREAS

(75) Inventors: Hiroaki Nemoto, Kokubunji (JP); Hideki Saga, Fuchu (JP); Hirofumi Sukeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/069,732

(22) PCT Filed: Mar. 1, 2000

(86) PCT No.: PCT/JP00/01200

§ 371 (c)(1), (2), (4) Date: Feb. 26, 2002

(87) PCT Pub. No.: WO01/65547

PCT Pub. Date: Sep. 7, 2001

(51) Int. Cl.
*G11B 11/00* (2006.01)

(52) U.S. Cl. .................. 369/13.54; 369/13.26

(58) Field of Classification Search .............. 369/30.23, 369/30.24, 13.12, 13.11, 13.02, 13.13, 13.54, 369/13.55, 13.56; 720/669, 670; 360/59; G11B 11/00, G11B 21/08, 7/08, 5/02, 7/085
See application file for complete search history.

(56) References Cited

U.S. PATENT DOCUMENTS

| | | | | |
|---|---|---|---|---|
| 5,029,030 A | * | 7/1991 | Luecke | 360/264.7 |
| 5,107,471 A | * | 4/1992 | Miyake et al. | 369/13.17 |
| 5,153,870 A | * | 10/1992 | Lee et al. | 369/111 |
| 5,202,862 A | * | 4/1993 | Ohta et al. | 369/13.17 |
| 5,270,987 A | * | 12/1993 | Kaku et al. | 369/13.02 |
| 5,296,995 A | | 3/1994 | Yonezawa et al. | |
| 5,517,471 A | * | 5/1996 | Ashinuma et al. | 369/13.02 |
| 6,091,673 A | * | 7/2000 | Murakami et al. | 369/13.12 |
| 6,104,676 A | * | 8/2000 | Yamamoto | 369/13.54 |
| 6,122,229 A | * | 9/2000 | Yonezawa | 369/13.08 |
| 6,317,280 B1 | * | 11/2001 | Nakajima et al. | 360/59 |
| 6,396,776 B1 | * | 5/2002 | Ueyanagi | 369/13.33 |
| 6,603,619 B1 | * | 8/2003 | Kojima et al. | 360/59 |
| 6,603,713 B1 | * | 8/2003 | Novotny et al. | 369/13.17 |

(Continued)

FOREIGN PATENT DOCUMENTS

JP 4-47512 2/1992

(Continued)

OTHER PUBLICATIONS

13-B-03, 13-B-04 in Magneto Optical Recording International Symposium '99 Technical Digest.

*Primary Examiner*—Tan X Dinh
(74) *Attorney, Agent, or Firm*—Mattingly & Malur, P.C.

(57) ABSTRACT

In an information recording/reproducing method performing a thermo-magnetic recording, a tracking offset value of a recording light spot and/or a tracking offset value of a magnetic flux detecting element is changed in accordance with a radial position at which a tracking is performed at the present time, to make a direction of a magnetic wall of a recording magnetic domain in accord with a longitudinal direction of the magnetic flux detecting element. Alternatively, a shape of a heated area is changed to be in accord with the direction of the magnetic flux detecting means at respective radial position, to make the direction of the magnetic wall of the recording magnetic domain in accord with the longitudinal direction of the magnetic flux detecting element.

5 Claims, 12 Drawing Sheets

U.S. PATENT DOCUMENTS

| | | | |
|---|---|---|---|
| 6,628,574 B1 * | 9/2003 | Shimazaki et al. | 369/13.09 |
| 6,775,100 B1 * | 8/2004 | Belser et al. | 360/137 |
| 6,876,603 B2 * | 4/2005 | Fuji et al. | 369/13.13 |
| 6,970,400 B1 * | 11/2005 | Wakabayashi et al. | 369/13.2 |
| 7,301,855 B2 * | 11/2007 | Aoyama et al. | 369/13.11 |
| 7,399,539 B2 * | 7/2008 | Shiratori | 369/13.55 |

FOREIGN PATENT DOCUMENTS

| | | | |
|---|---|---|---|
| JP | 04-048423 | | 2/1992 |
| JP | 5-182188 | | 7/1993 |
| JP | 5-298737 | | 11/1993 |
| JP | 06-76307 | * | 3/1994 |
| JP | 7-153126 | | 6/1995 |
| JP | 7-169115 | | 7/1995 |
| JP | 7-287888 | * | 7/1995 |
| JP | 10-21598 | | 1/1998 |
| JP | 10-134344 | | 5/1998 |
| JP | 2858455 | | 12/1998 |
| JP | 11-96608 | | 4/1999 |
| JP | 11-110748 | | 4/1999 |

* cited by examiner

PRIOR ART

MOST INNER CIRCUMFERENCE      INTERMEDIATE CIRCUMFERENCE      MOST OUTER CIRCUMFERENCE

DISK ROTATION

MAGNETO-OPTICAL RECORDING DEVICE CAPABLE OF CHANGING THE SHAPES OF HEATING AREAS

TECHNICAL FIELD

The present invention relates to an apparatus for recording and reproducing information with a recording medium to store the information by way of physical changes of information recording film formed on a surface of a substratum, wherein the information is recorded by way of thermomagnetic recording and a magnetic flux is detected on the above described recording medium so that the information is reproduced.

BACKGROUND ART

FIG. 1 shows an example of schematic view of a recording and reproducing head 11, a swing arm 12 and a disk medium 13 in a prior art magnetic disk apparatus. In case of recording and reproducing information onto a plane substrate in general, an access operation to select a position at which an information is recorded and reproduced is necessary. In addition, in order to record and reproduce the information while the track is being scanned consecutively, tracking operation for keeping the recording and reproducing head at the track is necessary. For these operations, it is necessary to position accurately the recording and reproducing head 11 with respect to the disk 13. Therefore, a prior art magnetic disk apparatus has a recording and reproducing head 11 mounted on the tip of a swing arm 12 so that the direction of the swing arm 12 is accurately controlled with a voice coil motor 14 disposed at the root of the swing arm 12. The recording and reproducing head 11 is a slider of a floating type, which is attached to the tip of the swing arm 12 through a suspension 15. The recording and reproducing head 11 is pressed against the disk 13 rotating rapidly with an appropriate weight by the suspension 15 so as to float stably at a predetermined height.

FIG. 2 is an enlarged view showing a bottom surrounding the recording and reproducing head 11. A friction face of an appropriate recess-projection structure is formed on the bottom of the recording and reproducing head 11 so as to give rise to good floating characteristics. In addition, to the rear end (from the friction direction) of the bottom of the recording and reproducing head, a magnetic flux detecting device 21 and a recording magnetic field generating device 22 are attached approximately parallel to each other and approximately perpendicular to the swing arm shaft 23. On the other hand, the disk medium 13 incorporated into the magnetic disk apparatus as a rotation member is provided with a number of tracks 16 at a constant pitch in a concentric circular state or a spiral state, and servo information, address information and recording data etc. are provided consecutively along these tracks.

In the prior art magnetic disk apparatus having the configuration as described above, the track is directed approximately perpendicular to the radius direction of a disk while the direction of the recording and reproducing head is determined by the direction of the swing arm shaft. Accordingly, it is impossible to always keep the magnetic flux detecting device 21 and the recording magnetic field generating device 22 parallel to the track orientation, and they are inclined by maximum 20° with respect to the track orientation. However, since the magnetic flux detecting device 21 and the recording magnetic field generating device 22 are fixed onto the same head, the relative direction between them is constant, and as shown in FIG. 3, a difference in shape between the magnetic domain 31 recorded by the recording magnetic field generating device and the magnetic flux detecting device 32 is small at any track position.

On the other hand, in recent years, studies on a system for recording by way of thermo-magnetic recording and reproducing by way of magnetic flux detection are being progressed. This technology is described in detail in JP-A-10-21598, for example. In this example, the recording light from a light source is irradiated through a transparent substrate to an optical magnetic recording film formed on a recording medium so that a magnetic domain is formed in the heated portion of the recording film and thus recording is executed. On the other hand, reproduction of information is executed by irradiating the reproducing light from the light source to the above described optical magnetic recording film through the substrate to detect rotation of the plane of polarization of the reflected light, and forming a second magnetic layer on the optical magnetic recording film to detect the leaked magnetic flux from this second magnetic layer.

Further, in 13-B-03 as well as 13-B-04 in Magneto Optical Recording International Symposium '99 Technical Digest, a system for executing recording by way of thermo-magnetic recording and executing reproducing by way of magnetic flux detection is disclosed further concretely. As the disk substrate, the polycarbonate substrate having the recess-projection structure on the surface is used while rare-earth transition metal alloy with TbFeCo as main material is used for the magnetic recording film. Since the recess-projection structure of the substrate surface can be used as servo information of light spots, the same servo information can be used for both of the optical recording system and the magnetic flux reproducing system so that the recess-projection structure is particularly suitable for this system. In addition, for a recording system, one of thermo-magnetic recording methods called as optical pulse magnetic field modulation method is used. Since the optical pulse magnetic field modulation recording system can keep the recording power margin wide in case of that a magnetic domains shorter than the diameter of the light spot (approximately 1.0 micron) in the track scanning direction are recorded, the optical pulse magnetic field modulation recording system is advantageous. In the above described known example, it is described that recording of 0.1 micron length equivalent to about one-tenth of the light spot diameter (approximately 1.0 micron) focused to the diffraction limit is obtainable.

However, since the magnetization direction in the approximately circular region is determined at every optical pulse irradiation in the above described optical pulse magnetic field modulation recording, the recording magnetic domain becomes approximately crescent. Therefore, in the case where reproduction is executed with normal magnetic flux detecting means with sensitivity distribution being approximately linearly shaped, the recorded magnetic domain is different in shape from the magnetic flux detecting means, therefore giving rise to a problem of deterioration in reproducing performance. That is, since the time where the magnetic flux detecting means passes the magnetic wall varies in accordance with the distance from the center of the track so that the response waveform from the recording magnetic domain expands in the time direction in coordinates, MTF of the reproducing system will be deteriorated, giving rise to increase in jitter of signal or worse resulting in increase in error rates or decrease in reliability. In addition, the magnetic walls approach extremely close to each other at the tip of the approximately crescent-shaped recording magnetic domains, giving rise to unstability easily followed by unexpected magnetic domain shape. The response from this portion is different from the originally recorded user data, and therefore will become a noise, preventing normal reproduction of user data. As a result described above, it was difficult to improve the recording density.

In order to cope with such a problem, a method using an optical head for elongating radially the shape of the light spot is considered. For example, the "Optical information recording apparatus" in Japanese Patent No. 2858455 specification describes a method in which a phase shift device having a partition line in a direction transversing the information track is disposed in the optical path of the optical head and the beams from the optical head are irradiated as two optical recording spots juxtaposed in the direction transversing the information track so that the heat distribution is effectively elongated perpendicular to the track and curvature of the recorded magnetic domain is made small. For similar effect, means (phase mask and intensity mask etc.) for adjusting appropriately the shape of the irradiated light spot may be arranged on the optical path of the optical head. Otherwise, for example, by a cylindrical lens arranged in an optical system to adjust a focusing position, an approximately oval-shaped optical spot can be formed on the recording film surface so that the short-side axis direction of the oval light spot is parallel to the track.

With such a prior art, also in the thermo-magnetic recording system, the recording magnetic domain having the magnetic wall transversing the track orientation can be formed. However, in the thermo-magnetic recording system as the above described prior art, the orientation of the recorded magnetic domain is constant from the inner circumference to the outer circumference of the disk. On the other hand, on accessing or tracking the magnetic domain formed in this system with the recording and reproducing head attached to the tip of the swing arm as in the prior art magnetic disk apparatus, the magnetic flux detecting means is directed variously according to the respective track position as described above. Therefore, in the innermost circumference and the outermost circumference of the tracks in particular as shown in FIG. 4, the direction of the magnetic wall of the recorded magnetic domain and the direction of the magnetic flux detecting means will be no longer in accord with each other. Accordingly, in case of combining the prior art magnetic flux detecting system for the magnetic disk with the prior art thermo-magnetic recording system, it is difficult to reproduce the recorded magnetic domain in high signal quality over all of the tracks from the inner circumference to the outer circumference.

An object of the present invention is, in view of the conventional construction of the magnetic disk apparatus as described above, to provide an information recording/reproducing apparatus and an information recording medium, in which a magnetic domain recorded by a thermo-magnetic recording system can be reproduced in the equivalent high signal quality over the whole disk area by a reproduction system with a magnetic flux detecting means mounted on a forward end of a swing arm.

DISCLOSURE OF THE INVENTION

According to the present invention, as a first method, in order to solve the above mentioned problem, a tracking position of an area heated by a heating means when a recording is performed with scanning a track formed on a recording medium in a thermo-magnetic recording system, and a tracking position of a magnetic-flux detecting means when a magnetic flux is detected from a recorded magnetic domain, are relatively changed in accordance with a radial position of the track scanned on the disk. In the conventional magnetic disk apparatus, the magnetic-flux detecting means is usually mounted in such a manner that the magnetic-flux detecting means has a sensitivity distribution elongated in a direction transversing the swing arm with respect to a swing-arm shaped supporting portion. If the swing arm rotates for the accessing operation and a direction of the swing arm is in accord with a direction of the track of the recording medium, it is preferable for the recording magnetic domain to be long in the direction traversing the track. However, if the direction of the swing arm is out of accord with the direction of the track, it is necessary that the magnetic domain oblique with respect to the direction transversing the track is formed. When the heated area is substantially circular, for example, the heating means is a minute light spot by an optical head, the more a distance between a magnetic wall of the recorded magnetic domain and the tracking center of the heating means is, the more an inclination of the magnetic wall is. Therefore, when the tracking position of the heating means is shifted from the track center, the tracking position of the magnetic flux detecting means is shifted, or both are shifted, the longitudinal direction of the magnetic flux detecting means and the magnetic wall direction of the magnetic domain at a position to be scanned by it can be made substantially in accord with each other.

When using the above first method, a relationship in tracking position between the recording method and the reproducing method in accordance with the track radial position should be determined. This can be predetermined geometrically if a shape of the heated area, rotational center positions of the magnetic flux detecting means supporting portion and the recording medium, the attached position of the magnetic flux detecting means and so forth are given. Further, as a method for determining more precisely the relationship in tracking position, a so-called test writing and test reading (calibration) may be used. This is the method in which the optimum tracking position is determined by repeating the recording and reproducing while changing the tracking position. If being applied to this system, by changing independently the tracking position of the magnetic flux detecting means and the tracking position of the heating means to perform the calibration, the relative tracking position and the absolute tracking position with respect to the track center optimum for both are obtained.

Also in the conventional magnetic disk apparatus, the calibrations with respect to both the magnetic head and the reproducing head are performed to determine the track position at each of the radial positions. However, a compensation of the track position in the conventional magnetic disk apparatus is for making the position of the recording magnetic domain and the scanning position of the magnetic flux detecting element substantially in accord with the track center, and a feature of the present invention different from the prior art is that the track position is shifted positively in accordance with the radial position.

As a second method, the optical head may be designed in such a manner that the heated area has a shape other than the circular shape and the shape of the heated area by the heating means may be rotated in accordance with the radial position of the scanned track. It is known that the magnetic domain recorded by the thermo-magnetic recording system is substantially in accord with the shape of the heated area. Therefore, if the shape of the heated area is changed so that the shape of the magnetic domain to be recorded is changed in accordance with an orientation of the magnetic flux detecting means at respective radial position of the recording medium, the shapes of the magnetic flux detecting means and recording magnetic domain are made substantially in accord with each other as the first method. Actually, since the sensitivity distribution of the magnetic flux detecting element is changed in accordance with the swing arm orientation supporting it, the appropriate shape of the heated area at respective radial position is obtainable by rotating a part or the whole of the heating means in accordance with the radial position. Particularly, if at least the part of the heating means is formed on the swing arm supporting the magnetic flux detecting element (or another swing arm of the same structure), the shape of the heated area is easily kept always constant with respect to the magnetic flux detecting element without a complex mechanical system.

As shown in FIG. 2, the magnetic flux detecting means has usually the sensitivity distribution elongated in the direction transversing the swing arm. For making the shape of the recording magnetic domain in accord with the sensitivity distribution of the magnetic flux detecting means, it is desirable that the longitudinal direction of the heated area by the heating means also transverses the swing arm. Further, if the heating means is the minute light spot by a light emitting means, it is necessary that the shape of the light spot is differentiated from a substantially circular minimum blur circle. For this, the minute light spot elongated in the swing arm transversing direction is formed on the recording medium by arranging a certain optical element on an optical path of the light emitting means. As the certain optical element, the above mentioned phase shifting element, cylindrical lens or the like is usable. Further, when the heated area is controlled by the light leaking from a forward end of an optical probe, the desirable shape of the heated area is obtainable by setting a minute opening of the probe forward end at the predetermined shape.

According to the prior art of the above mentioned patent publication No. 2858455 disclosing that the shape of the heated area is changed appropriately, an orientation of the phase shift element is fixed to have a dividing line in an information track orientation, so that only the same shape of light spot is formed along the track orientation irrespective of the radial position. On the contrary, the present invention is differentiated from the prior art by that the optical element is arranged to have the dividing line parallel to the swing arm shaft so that the light spot varying in accordance with the radial position of track is formed.

Further, also when using the above second method, the shape of the recording magnetic domain and the sensitivity distribution of the magnetic flux detecting element can be more precisely adjusted by being combined with the first method in which the tracking position of the heating means is changed relatively with respect to the tracking position of the magnetic flux detecting means in accordance with the radial position of track on the disk to be scanned.

Further, for increasing the effect obtained by the above structure, it is effective for the recording medium to include a substrate with surface unevenness. A method using the substrate with the surface unevenness as the recording medium is disclosed by, for example, U.S. Pat. No. 5,296,995 "Method of Magnetically Recording and Reading Data, Magnetic Recording Medium, Its production Method and Magnetic Recording Apparatus". In this example, a disk including a polycarbonate substrate with a preformed surface unevenness is used. This disk enables servo-information, address information and recording information to be previously written in the uneven structure formed precisely on the substrate surface, so that the information is easily recorded in a narrow track. Further, a SN ratio deterioration is restrained by forming a groove as a guard band between the tracks to prevent the information recorded in the adjacent track from proceeding into the reproducing channel. By these effects, a format capacity of the information recording apparatus can be increased. Further, this disk can be produced at low cost and in commercial quantity by producing many replicas from a single mother disk similarly to, for example, optical disks.

When using the medium like this, an amplitude of reproduced signal is maximized by that the magnetic flux detecting means scans the substantially central position of the land-shaped track formed by the projecting part of recording medium. Further, a sensitivity width of the magnetic flux detecting means in a direction perpendicular to the track, is preferably not less than a land width and not more than a total amount of two groove widths at both sides and the land width. It should also be prevented from extending over the guard band formed left and right grooves so that the information on the adjacent track is prevented from being destroyed, when the magnetic domain is recorded by the heating means and recording magnetic field applying means.

When the recording/reproducing characteristics are optimized on this disk by the above first method, the heating means scans the disk at a position distant from the track center. And, this off-track value of an track at a disk intermediate circumference is smaller in comparison with inner circumference side and/or outer circumference side. Since the larger the off-track value is, the greater the magnetic domain recorded protrusively from the projecting portion is, the width of the guard band formed by the recording medium recess has preferably a relatively greater width at the inner circumference side and/or outer circumference side, in comparison with the intermediate circumference portion of recording medium. Further, the above mentioned guard band can be formed by a method other than forming the unevenness on the disk surface. For example, JP-A-7-153126 discloses a method in which a coercive force and so forth of a recording magnetic layer at respective position is adjusted by a surface roughness just under the recording magnetic layer. When the recording magnetic layer is formed after forming, alternatingly in the disk radial direction, regions different in surface roughness from each other and the region of relatively low coercive force is used as the recording track as disclosed by the above mentioned publication, the recording magnetic domain is prevented according to the recording condition from being formed at the region of relatively high coercive force between the tracks. Therefore, the region of relatively high coercive force can have the guard band function as mentioned above. The same effect can be obtained by a difference in optical characteristic and thermal conductivity including the magnetic recording layer, a difference in layer thickness, a difference in stress in the interior of the magnetic recording layer and so forth.

The servo information, address information and recording information on the substrate disclosed by the above U.S. Pat. No. 5,296,995, are formed, as shown in FIG. 16, by position, size or the like of the recess or projection shape (hereafter, called as information pit) on the recording layer surface. With the servo pits 204, and address/clock pits 205 on a servo region 201, the magnetic flux detecting element and optical head scan correctly a predetermined position of a target track on the disk, so that a predetermined recording magnetic domain 207 can be written into a data region 202.

However, conventionally, this information pit has a longitudinal axis constant with respect to the track orientation irrespective of the radial position of track on the disk, and usually, it is perpendicular to the track orientation. In order to detect the information at this servo region by the magnetic flux detecting element in high resolution, it is preferable that the longitudinal direction of the information pit and the longitudinal direction of the magnetic flux detecting element is made in accord with each other. However, similarly to the above discussion regarding the recording magnetic domain, it is difficult for a good reproducing characteristic to be obtained over the whole range of the disk, when these information pits are read out by the conventional magnetic disk apparatus in which the swing arm moves the magnetic flux detecting element, because the inclination of the magnetic flux detecting element with respect to the track orientation changes from the inner circumference to the outer circumference. For solving this problem, the information pits are formed on the recording medium while the longitudinal direction of the information pit is changed appropriately in accordance with the radial position, in compliance with specific characteristic of the information recording apparatus in which that information recording medium is used.

For obtaining an appropriate inclination direction of the information pit, a change of longitudinal direction of the magnetic flux detecting element in accordance with the disk radial position should be known. As shown in FIG. 17, it can be determined substantially geometrically from a distance R between the disk rotational shaft and the swing arm rotational shaft, a distance r between the swing arm shaft and the magnetic flux detecting element, an angle θ between the disk rotational shaft orientation and the swing arm orientation as seen from the swing arm rotational shaft, and so forth.

For example, if the magnetic flux detecting element is arranged on the central line of the swing arm while its longitudinal direction is made perpendicular to the swing arm, the disk radial position d is a function of θ, as $$d=(r^2+R^2-2rR\cos q)^{-1/2}$$

and, a direction α of the magnetic flux detecting element with respect to the track at this time, is, from FIG. 17, $$\cos b=(r^2+d^2-R^2)/2rd, \text{ therefore, } a=180°-b.$$

The information recording medium substrate having a desired surface shape can be obtained through a cutting process by laser beam or electron beam, or by a lithography process by a contact exposure or a reduction projection exposure, while determining the direction of the information pit of the information recording medium with taking the radius d and the angle α into consideration.

By using the above mentioned information recording/reproducing apparatus and information recording medium, the shapes of the magnetic domain recorded by the thermo-magnetic recording method and the information pit formed by the surface unevenness can be changed in accordance with the track radial position, and the shapes of the magnetic domain and the information pit at the respective position can be made approximately in accord with the orientation of the magnetic flux detecting element driven by the swing arm. As a result of that, a data signal, servo signal, address signal, clock signal or the like can be reproduced constantly in high quality over the whole track range between the most inner circumference and most outer circumference of the recording medium.

BEST MODE FOR CARRYING OUT THE INVENTION

Figure 1:
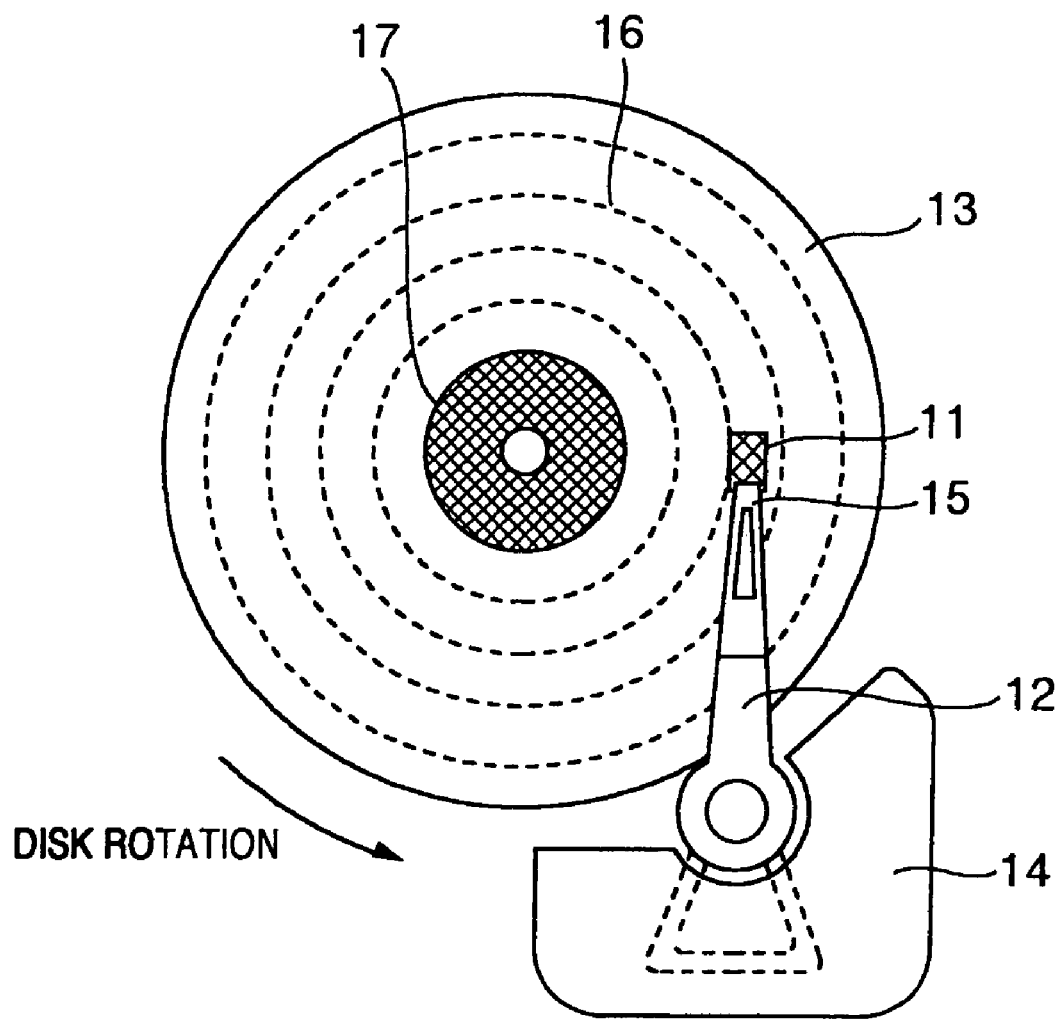
FIG. 1 is a schematic view of a conventional magnetic disk apparatus.
Figure 2:
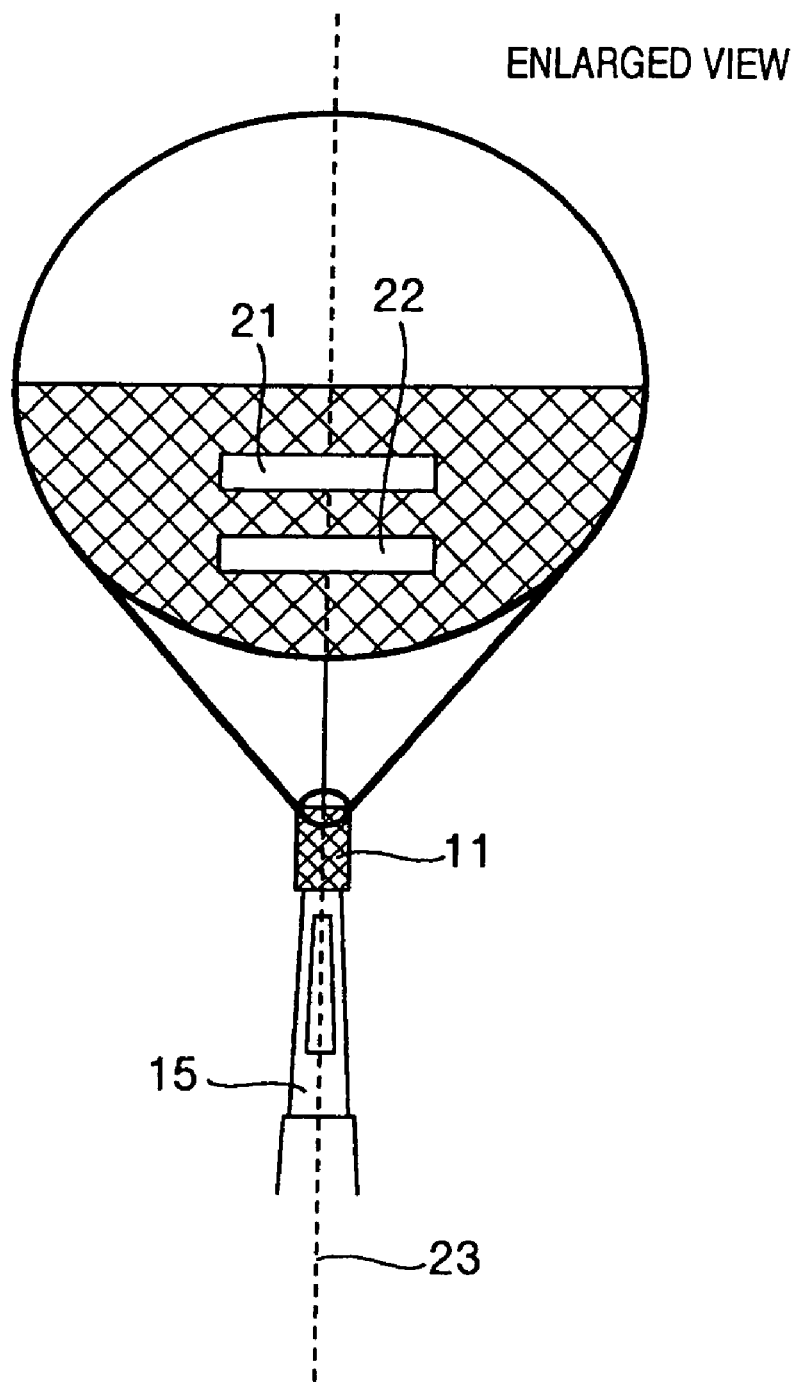
FIG. 2 is a view of a recording/reproducing head of the conventional magnetic disk apparatus.
Figure 3:
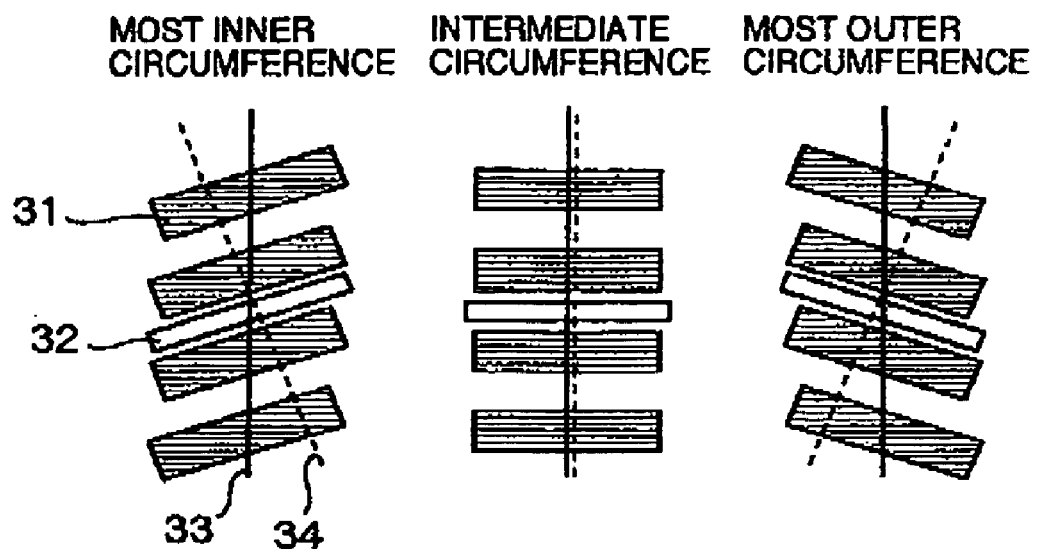
FIG. 3 is a view showing a positional relationship between a recording magnetic domain shape and a magnetic flux detecting means in the conventional magnetic disk apparatus.
Figure 4:
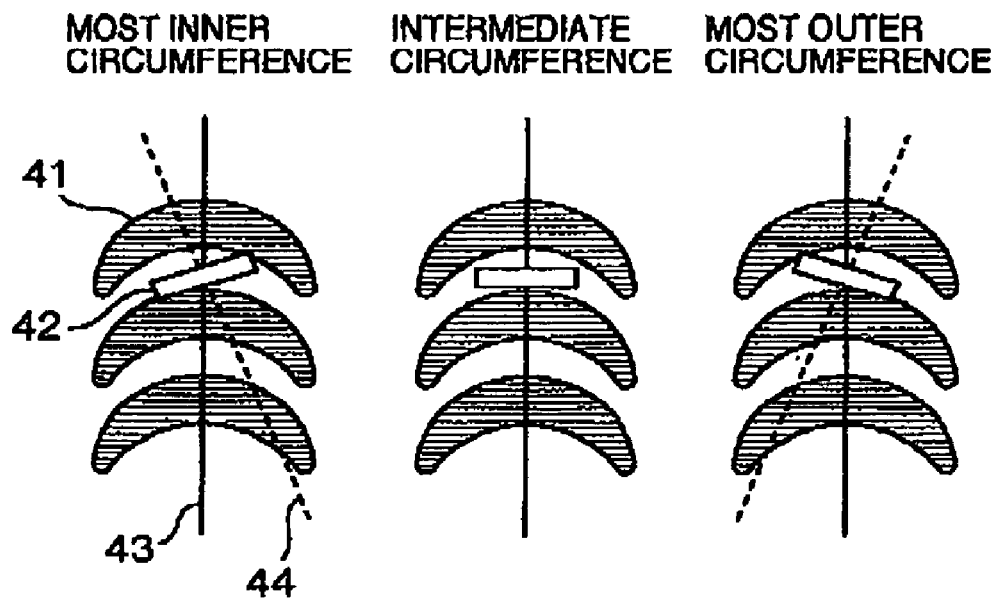
FIG. 4 is a view showing a positional relationship between a recording magnetic domain shape and a magnetic flux detecting means in a conventional thermo-magnetic recording apparatus.

At first, the symbols for description will be described.
The respective numerals used in the drawings denote:
11 . . . recording and reproducing head, 12 . . . swing arm, 13 . . . recording medium, 14 . . . voice coil motor, 15 . . . suspension, 16 . . . track, 17 . . . motor, 21 . . . magnetic flux detecting device, 22 . . . recording magnetic field generating device, 23 . . . swing arm shaft, 31 . . . recording magnetic domain, 32 . . . magnetic flux detecting device, 33 . . . tracking center, 34 direction of the swing arm shaft, 41 . . . recording magnetic domain, 42 . . . magnetic flux detecting device, 43 . . . tracking center, 44 . . . direction of the swing arm shaft, 51 . . . optical head, 52 magnetic coil, 53 . . . magneto-resistive element, 54 swing arm, 55 . . . floating slider, 56 . . . magnetic recording film, 57 . . . disk substrate, 61 . . . optical head fixing part, 62 . . . optical head movable part, 63 . . . linear motor, 64 . . . magnetic reproducing head, 65 . . . swing arm, 66 voice coil motor, 67 . . . recording medium, 71 . . . recording magnetic domain, 72 magnetic flux detecting device, 73 . . . direction of the swing arm shaft, 74 . . . tracking position of optical spots, 75 . . . tracking position of the magnetic flux detecting device, 81 recording magnetic domain, 82 . . . magnetic flux detecting device, 83 . . . tracking center line, 84 . . . tracking position of optical spots, 85 . . . track (land part), 86 . . . guard band (groove portion), 91 . . . recording magnetic domain, 92 . . . magnetic flux detecting device, 93 . . . tracking center line, 94 . . . tracking position of optical spots, 95 . . . track, 96 . . . guard band, 101 . . . magnetic flux detecting device, 102 . . . swing arm for magnetic flux detecting device, 102A . . . swing arm shaft, 103 . . . mirror, 104 . . . optical head movable part, 105 . . . swing arm for optical head, 105A . . . swing arm shaft, 106 . . . roller guide, 107 . . . optical head fixing part, 108 . . . recording medium, 111 . . . phase plate, 112 . . . start-up mirror, 113 . . . objective lens, 114 . . . recording magnetic film, 115 . . . beam, 121 . . . optical spot intensity distribution, 122 . . . thermal distribution, 123 . . . recording magnetic domain, 124 . . . track (land part), 125 . . . guard band, 131 . . . floating slider, 132 . . . pin hole, 133 . . . coil wiring for recording magnetic field, 134 . . . magnetic flux detecting device, 135 . . . pin hole, 136 . . . coil for recording magnetic field, 137 . . . recording medium surface, 201 . . . servo region, 202 data region, 203 . . . guard band, 204 . . . servo pit, 205 . . . address/clock pit, 206 . . . tracking center, 207 . . . recording magnetic domain, 211 . . . information recording medium, 212 . . . swing arm, 213 . . . swing arm rotation shaft, 214 . . . disk rotation shaft, 221 . . . swing arm rotation shaft, 222 . . . spot condensing position, 223 . . . disk rotation shaft, 224 . . . master disk, 225 . . . swing arm, 226 . . . mirror, 227 . . . master disk exposing apparatus optical system (fixing part), 228 . . . master disk exposing apparatus optical system (movable part), 229 . . . optical path of laser beam.

Successively, the present invention will be described based on practical embodiments with reference to drawings.

Embodiment 1

Figure 5:
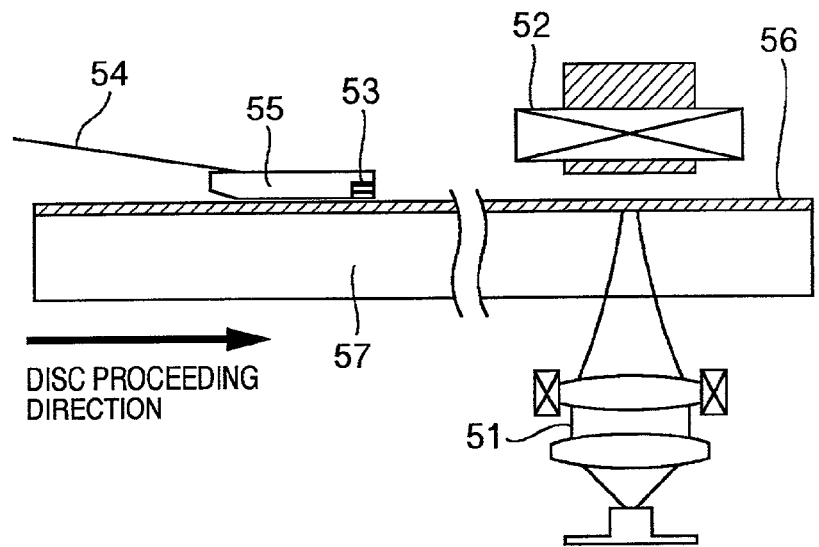
FIG. 5 is a view showing an information recording/reproducing apparatus and a recording medium according to a first embodiment.

Embodiment 1 of an apparatus for recording and reproducing information as well as information recording medium is shown in FIG. 5. A disk substrate 57 is mounted inside the apparatus rotatably and is driven to rotate with a not-shown spindle motor. An optical head 51 as well as a magnetic coil 52 likewise a prior art magneto-optical disk moves linearly in the radius direction while maintaining relative positional relationship so that a approximately circular micro light spot is formed and a magnetic field is applied to its vicinity to execute thermo-magnetic recording. On the other hand, the magneto-resistive element 53 is mounted on the tip of the swing arm 54 so as to scan the magnetic domain on the recording track while floating in the vicinity of the recording disk surface, and obtains reproducing signals by detecting magnetic flux from the surface of the medium. While recording and reproducing, the light spot or the magneto-resistive element 53 are made to follow the track respectively and to scan on the magnetic recording film 56. In order to make the light spot follow the track, it is advisable that the structure by recess-and-projection or change in optical constant is formed in the substrate in advance and the lens actuator inside the optical head is driven in a consecutive servo method or a sample servo method having been used for prior art optical disks. In order to make the magneto-resistive element 53 follow the track for scanning, the magnetic information for servo is recorded onto the substrate in advance so that the voice coil motor attached to the swing arm 54 is driven in the sample servo method having been used for the prior art magnetic disk apparatus. With application of these servo methods, the light spot for recording and the magneto-resistive element 53 for reproducing can be caused to execute tracking at predetermined positions of any tracks respectively.

As the magnetic layer of the magnetic recording film 56 filmed on the surface of a disk substrate, a rare-earth transition metal alloy being one of magnetic films appropriate for thermomagnetic recording method was used. On the grounding layer of silicon nitride of 65 nm, a first magnetic layer of 15 nm made of $Tb_{24}Fe_{48}Co_{28}$ (bottomed small suffixes are respectively at %) and a second magnetic layer of 35 nm made of $Tb_{10}Dy_{25}Fe_{32}Co_{33}$ were sequentially laminated. In order to enhance corrosion resistivity of the magnetic layer containing the rare-earth components, silicon nitride of 5 nm is provided thereon as a protection layer and furthermore a carbon friction-proof film of 5 nm is provided. Since the first magnetic layer is appropriate for thermomagnetic recording while the second magnetic layer has high magnetic flux density and will not cause bad influence against recording, these are appropriate for both of the thermomagnetic recording method and the magnetic flux reproducing method.

Figure 6:
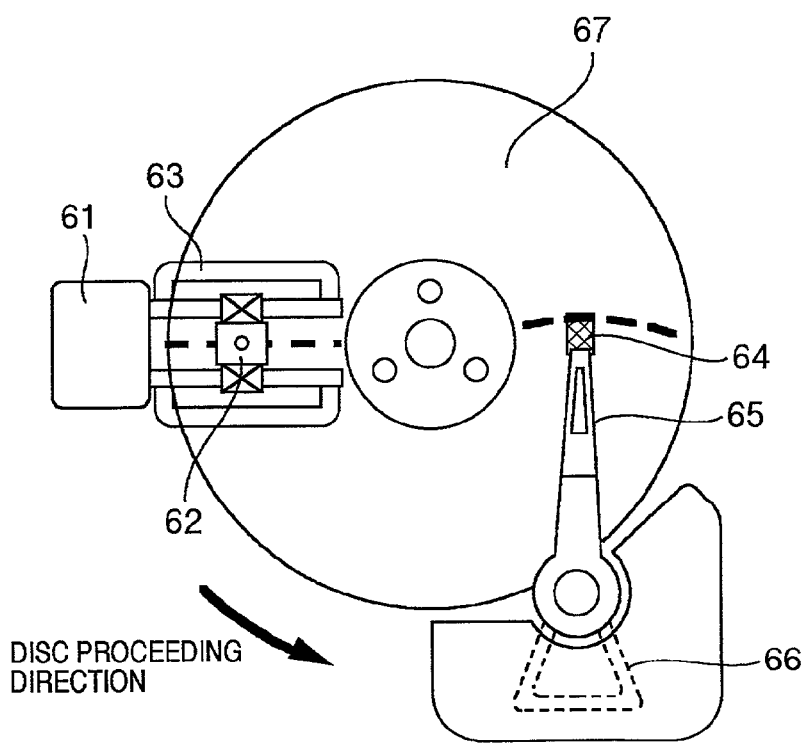
FIG. 6 is a view showing a movement position of a recording/reproducing head in the information recording/reproducing apparatus according to the first embodiment.

FIG. 6 shows how the optical head as well as the magnetic flux detecting device of the present embodiment moves with respect to the recording medium. The optical head is divided into a fixing part 61 and a movable part 62, and laser modules, a photo detector and the optical system for dividing and collimating lights are contained in the fixing part 61. In addition, optical devices such as an actuator to execute focus tracking and an objective lens mounted on the actuator are disposed in the movable part 62. This optical head movable part 62 is driven linearly in the disk radius direction with a linear motor 63 so that accordingly the radiation position (dotted line) of the light spot moves linearly. In addition, the magnetic flux detecting device 64 (the magneto-resistive element in the present embodiment) is mounted on the swing arm 65 and rotates on the fulcrum of the swing arm with the voice coil motor 66 so as to move along a circular arc (a dotted line). Here, the light source wavelength of the optical head was approximately 660 nm with the aperture of the objective lens being 0.6, the light spot irradiated onto the recording film surface being shaped approximately as a circle with its diameter being approximately 1 mm.

In the present embodiment, recording was executed in a method of the thermomagnetic recording methods widely known as the optical pulse magnetic field modulation method. In this method, since heating and cooling is repeated intermittently while the center of the heating region is shifted at a constant distance in association with scanning of the light spot, the magnetization direction of the approximate circular region is determined on each of the optical pulse radiation. As the irradiation distance of the optical pulse is made short, the above described approximate circular regions are overlapped each other so that recording is proceeded as if the approximate crescent recording magnetic domain is formed for each optical pulse radiation. The optical pulse magnetic field modulation recording, where it is difficult for the size of the recording magnetic domain (the gap for broch magnetic wall) is be adjusted to the size of the light spot, is a method advantageous in particular to form a minute recording magnetic domain.

Figure 7:
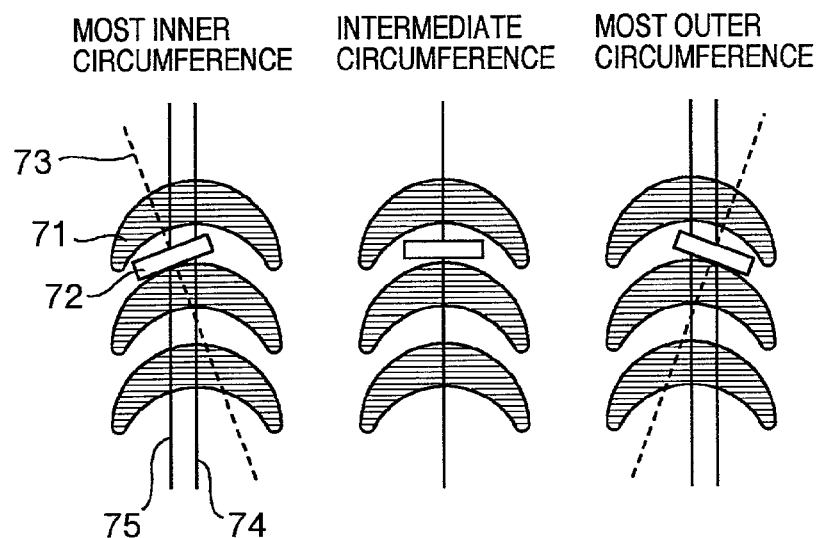
FIG. 7 is a view showing a positional relationship between a recording magnetic domain shape and a magnetic flux detecting means in a thermo-magnetic recording apparatus according to the first embodiment.

Appearance of the recording magnetic domain at the time when thermomagnetic recording was actually executed with this optical head is shown in FIG. 7. The recording medium 67 is provided with sample servo pits detectable with the optical head in each part of the disk so that any track position of the track in each radius position of a disk can be scanned. In addition, the magnetic flux detecting device can scan any position with the sample servo signals provided to each part of the disk. In addition, the recording medium was initialized to uniform the magnetization direction of the magnetic film prior to recording. In FIG. 7, the scanning position of the optical head was controlled to pass the center part of the track determined by the sample pit. In addition, the laser output was appropriately adjusted to give rise to the recording magnetic domain width of approximately 0.6 mm.

In the case of the information recording apparatus shown in the present embodiment, it is known that the swing arm inclines by approximately 20° in the innermost circumference/the outermost circumference track due to geometrical positional relationship between the recording medium and the swing arm. Accordingly, the longitudinal direction of the magnetic flux detecting device inclines by approximately 20° with respect to the disk transversing direction. Therefore, as in FIG. 6, it was found out that the track position of the magnetic flux detecting device is placed inward for the inner circumference and is placed outward for the outer circumference so that the magnetic flux detecting device and the magnetic wall direction could be in accord with each other. In the assumption that the magnetic domain undergoing recording is approximately circular, the optimum off-track quantity x of the scanning position of the magnetic flux detecting element with respect to the recording magnetic domain center is given as follows:

$$x = r \times \sin(Q).$$

At this time, "r" denotes the curvature radius of the magnetic wall of the recording magnetic domain while "Q" is the angle constituted by the longitudinal direction of the magneto-resistive device and the track transversing direction. In this case, since "r" is 0.3 mm and "Q" is 20°, the off-track quantity will become 0.1 micron. That is, if the track position of the magnetic flux detecting device is shifted inward by approximately 0.1 mm at the inner circumference and outward by approximately 0.1 mm at the outer circumference, the quality of the reproducing signals will be improved most. Actually, the curvature of the magnetic wall being formed is not constant but will be different based on recording conditions and deterioration state of the recording film, and therefore it is difficult to optimize the off-track quantity for the radius position of the track by determination as in the above described equation. Accordingly, the method that an approximate off-track quantity is predicted from the geometrical equation as described above and calibration is executed regularly inside the apparatus so as to adjust the off-track quantity to the optimum value is effective.

Figure 15:
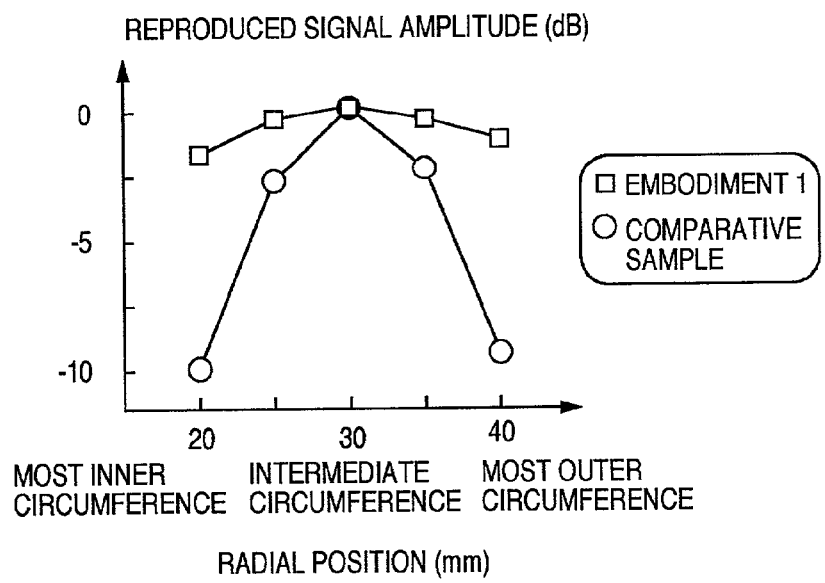
FIG. 15 is a view showing a relationship between a track radial position and reproduced signal amplitude of the recorded magnetic domain in the apparatus of the first embodiment.
Figure 16:
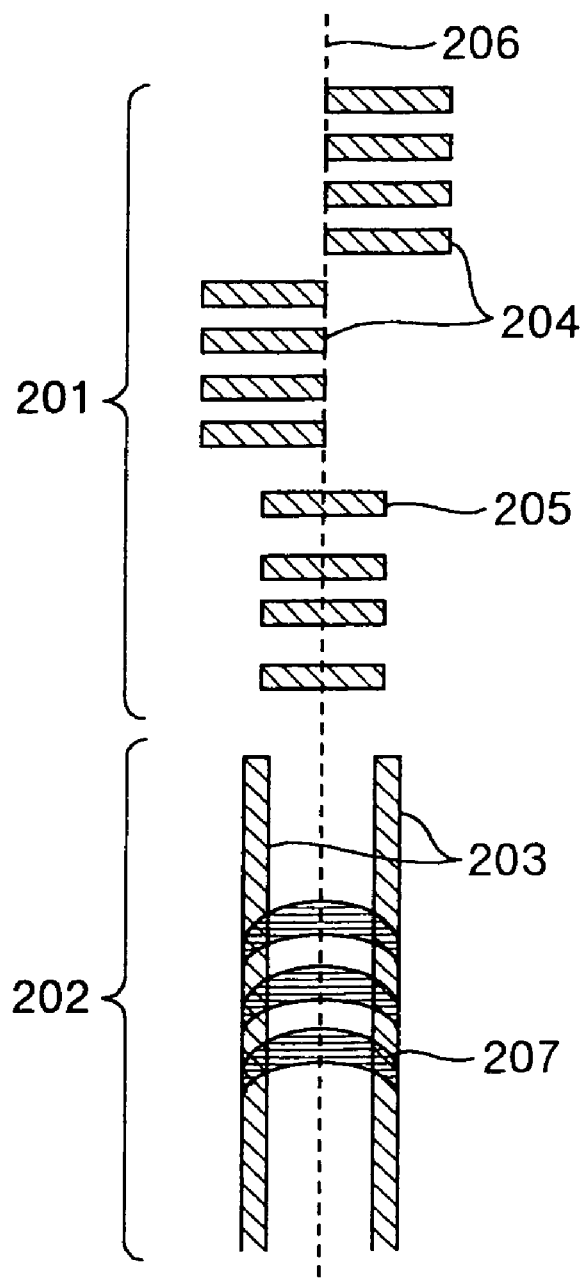
FIG. 16 is a view showing information pits in a magnetic disk with a conventional surface unevenness.
Figure 17:
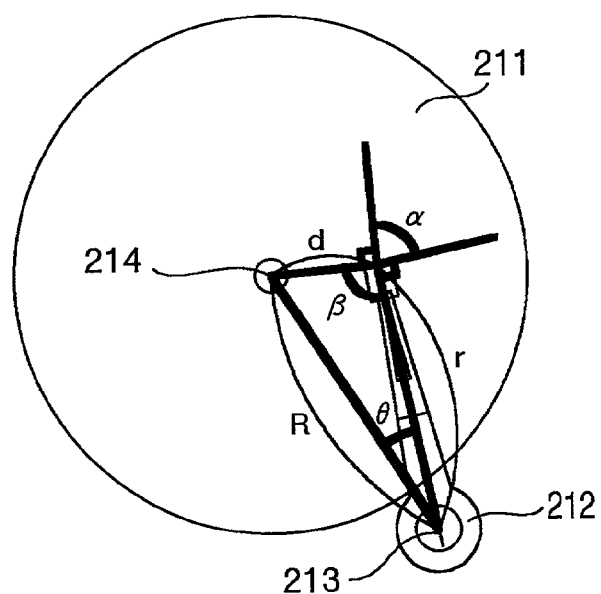
FIG. 17 is a view for obtaining an angle of the magnetic flux detecting element with respect to the track, from a disk radial position.

In addition, even if the recording magnetic domain center is deviated from the track position of the magnetic flux detecting device, when the magnetic flux detecting device has a size of about the recording magnetic domain width, the both ends of the magnetic flux detecting device will be deviated from the direction of the magnetic wall, making small the effect of improvement in reproducing signal quality. Thus, in order to solve the problems in the case of comparatively wide width of the magneto-resistive element, as in FIG. 8, a recording medium having approximately concentric surface recesses and projections was used as the recording medium, and the projection part (land) was used as the recording track and the left and right grooves were used as the guard bands. The track width was set at approximately 0.4 mm while the track groove width was at approximately 0.25 mm. In addition, since this groove is deep with approximately 150 nm depth and the magnetic flux from the magnetic domain recorded inside the groove will get weaker to an ignorable level compared with the magnetic flux from the magnetic domain on the land, the groove functions effectively as the guard band. The magnetization direction of the recording medium was uniformly initialized prior to recording. Since the magnetic flux detecting device detects signals only from the tracks consisting of the convex parts, the tracking position of the magnetic flux detecting device was set at the track center in order to maximize the output. On the other hand, the scanning position of the light spot is adjusted outward by approximately 0.1 mm for the innermost circumference while being adjusted inward by approximately 0.1 mm for the outermost circumference. As a result thereof, the direction of the magnetic wall on the track is approximately in accord with the direction of the magnetic flux detecting device, and in particular in case of that the magnetic wall interval (length of the magnetic domain) is short, improvement in resolution capability in magnetic flux reproduction can be expected. In FIG. 15, there was shown a relationship between the track position and the reproducing signal amplitude when reproducing experiment was executed with the magnetic flux detecting device having sensitive width of approximately 0.2 mm in the minor axis direction (in the direction of swing arm) and of approximately 0.8 mm in the longitudinal direction after the consecutive magnetic domains of 0.2 mm length was recorded all over the disk. In addition, the signal amplitudes in the case where the light spot is made to scan the track center all over the track for recording as a comparative experiment. It was found out that for the comparative experiment, the drop of signal amplitude at the innermost circumference and the outermost circumference reached approximately 10 dB, but in contrast, the present embodiment came up with only 2 dB with improvement as much as 8 dB.

Figure 8:
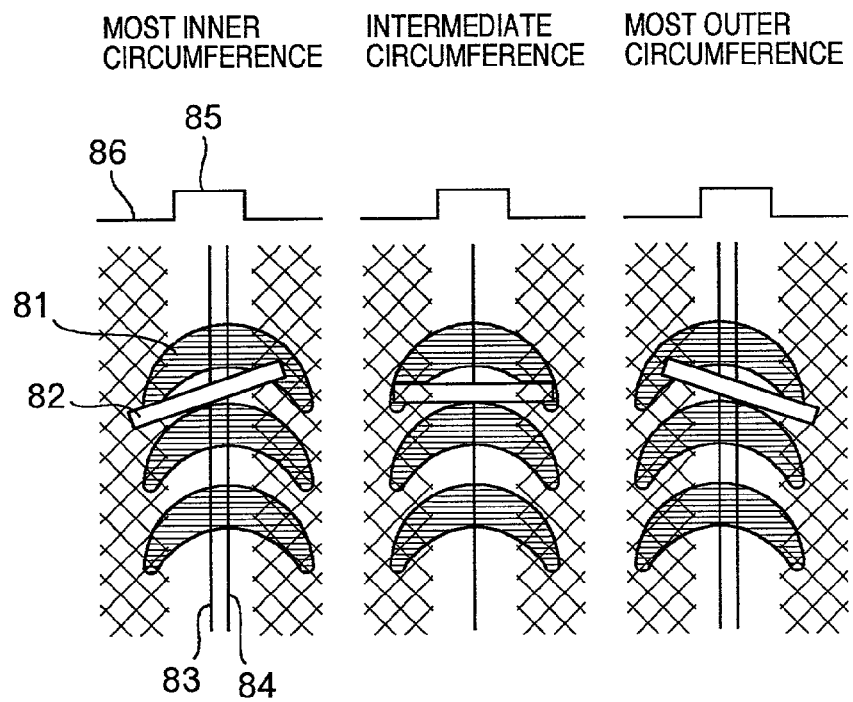
FIG. 8 is a view showing the magnetic flux detecting element and the magnetic domain recorded on the recording medium according to the first embodiment.
Figure 9:
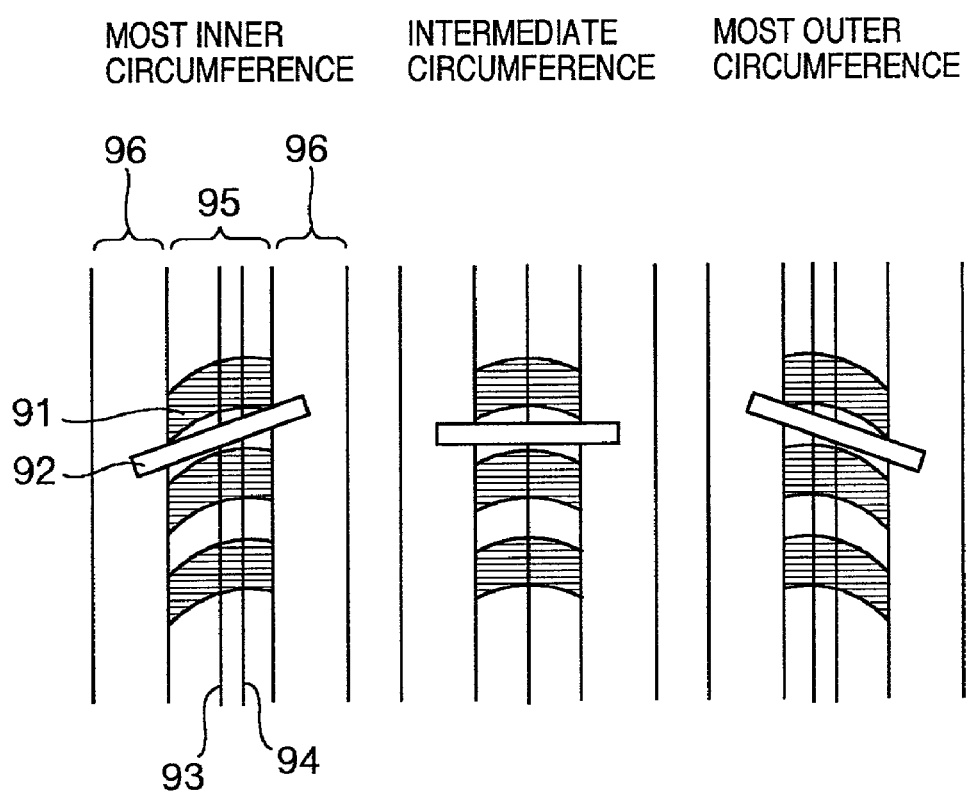
FIG. 9 is a view showing the magnetic flux detecting element and the magnetic domain recorded on the recording medium according to the first embodiment.

FIG. 9 is another example of the recording medium involving guard bands. This information recording medium has substantially concentric circular regions of respective surface roughnesses different slightly from each other in stead of the recess-projection surface. When a thermomagnetic recording film (for example TbFeCo amorphous magnetic film) is formed herein, the portion with less surface roughness will provide relatively less coercive force and on the contrary the portion with larger surface roughness will provide relatively larger coercive force. Under the circumstances, at the time of initialization, magnetization over the entire recording medium was aligned in the same direction with a large magnetic field at first, and subsequently a relatively smaller magnetic field in a reverse direction was applied so that only magnetization in portion of the relatively smaller surface roughness was aligned in the reverse direction. Next, with the portion with comparatively less coercive force being the recording track and with the portion with large coercive force being the guard band, recording as in FIG. 8 was implemented. At this time, while reverse magnetization took place on the track with less coercive force, reverse magnetization did not take place on a part with larger coercive force, and as a result, the magnetic domain as shown in FIG. 9 was formed. In the drawings, the black portions indicate upward magnetization while the white portions indicate downward magnetization. By creation of such magnetic domain state 91, the direction of the magnetic wall formed by recording was made in accord with the magnetic flux detecting device 92 so that the effect likewise the case in FIG. 8 was confirmed.

Incidentally, as apparent from FIG. 8 and FIG. 9, the width of the recorded magnetic domain extending over the guard band is only approximately 0.1 mm (in the left-to-right direction) in the intermediate circumference part of the disk, but in contrast, becomes 0.2 mm in either inward or outward in the innermost circumference, that is, twice. In the present embodiment, the guard band width of approximately 0.25 mm was adopted sufficiently, giving rise to no problems, but adoption of large guard band width like this will reduce the recording density. As for the roomy middle circumference part of a disk, the guard band width is made narrower (for example, to reach 0.15 mm) while the width of the track itself is made to remain same so that recording capacity per one recording medium can be increased without affecting the recording and reproducing performance.

Embodiment 2

Figure 10:
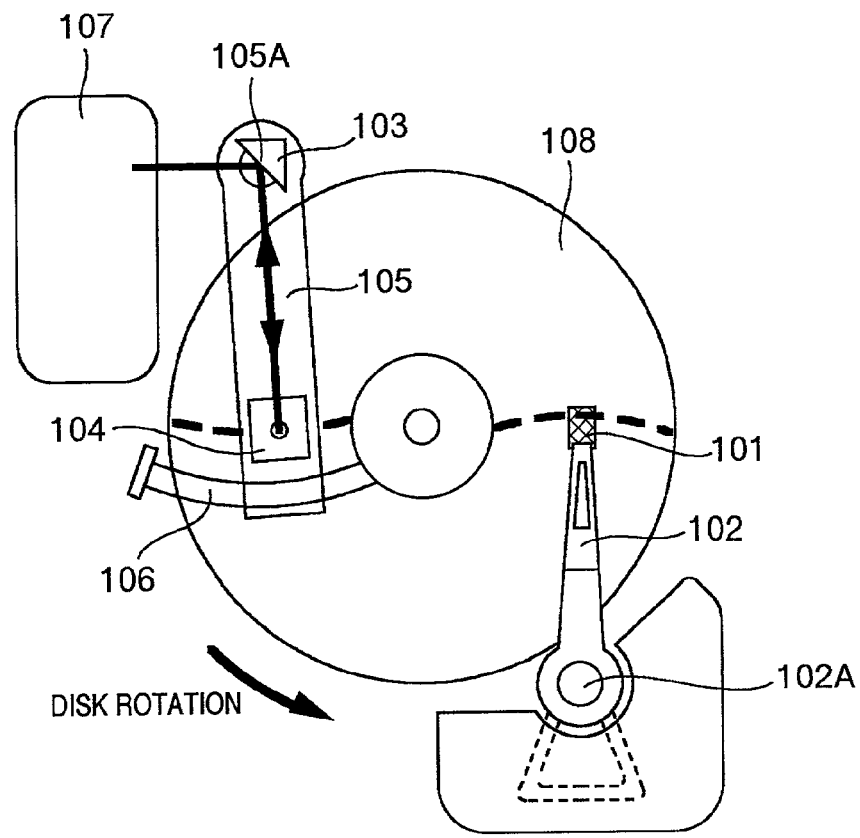
FIG. 10 is a view showing a movement position of a recording/reproducing head in the information recording/reproducing apparatus according to the second embodiment.

Another Embodiment 2 of the present invention is shown in FIG. 10. Difference from Embodiment 1 is the moving method of the optical head movable part 104. The optical head movable part 104 is fixed onto the optical head swing arm 105. This swing arm is supported by the rotation shaft 105A and the roller guide 106 so as to rotate around the rotation shaft 105A as the center. The collimated beam radiated from the optical head fixing part 107 is lead to the movable part 104 with a mirror 103, and focused onto the recording film of the recording medium 108 with the optical devices constructed inside this optical head movable device. In addition, the mirror 103 is designed so as to rotate synchronously in accordance with the rotation of the swing arm 105 to be led appropriately by the optical head movable part 104. The distance from the rotation center of the recording medium to the optical head swing arm shaft 105A is made equal to the distance to the magnetic flux detecting device swing arm shaft 102A, and the rotation radius of the objective lens is made equal to the rotation radius of the magnetic flux detecting device 101 so that the directions of the recording head and the reproducing head with respect to the track were made equal to each other at respective radial position.

Figure 11:
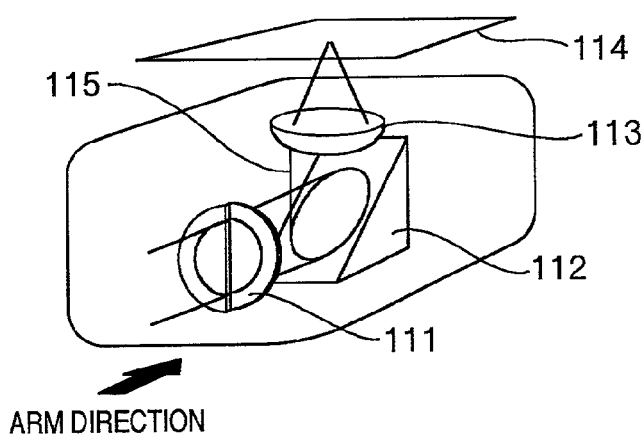
FIG. 11 is a view of an optical head movement portion in the information recording/reproducing apparatus according to the second embodiment.
Figure 12:
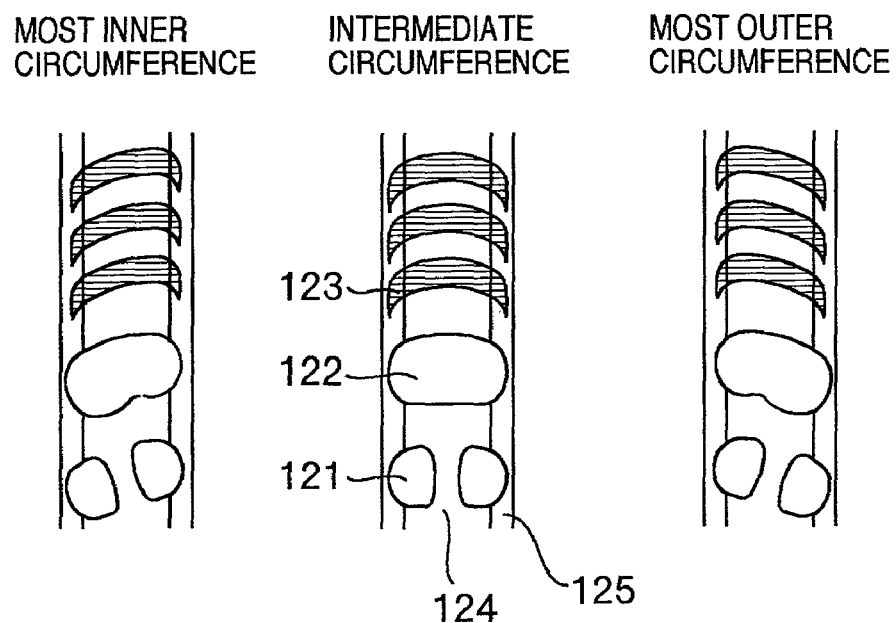
FIG. 12 is a view showing shapes a light spot, heated area and recorded magnetic domain in the information recording/reproducing apparatus according to the second embodiment.

In addition, FIG. 11 is a block diagram showing an optical device inside the optical head movable part 104. The collimated beam 115 from the optical head fixing part 107 is transmitted at first through the phase plate 111. This phase plate has a division line approximately in the center of the beam to add a phase difference of a half wavelength at its left part and its right part. Thereafter, the beam is bent toward the recording medium 114 with a rising mirror 112 and is condensed onto the recording film surface with an objective lens 113. The phase plate 111 is effective for the shape of the focused light spot. The light having such the phase difference has an intensity distribution 121 as shown in FIG. 12 on the recording film surface, and will become a so-called two-headed spot. In the case where the recording medium undergoes temperature increase with such two-headed spots, the thermal distribution will be shaped as indicated by reference numeral 122. In the thermo-magnetic recording method, only the portions of not less than a certain temperature cause reverse magnetization, and therefore the magnetic field modulation system is applied so that the recording magnetic domain such as reference numeral 123 is formed.

Thus, with the optical head moving method and the optical devices as shown in the present embodiment, a magnetic domain inclined to the left in the inner circumference side of the recording medium and a magnetic domain inclined to the right in the outer circumference side can be formed. The degree of this inclination approximately is made in accord with the direction of the magnetic flux detecting device by a construction as shown in FIG. 10. If the scanning position of the recording light spot or the scanning position of the magnetic flux detecting device is adjusted with calibration, the accord with the magnetic wall direction of further higher accuracy is obtainable.

Embodiment 3

Figure 13:
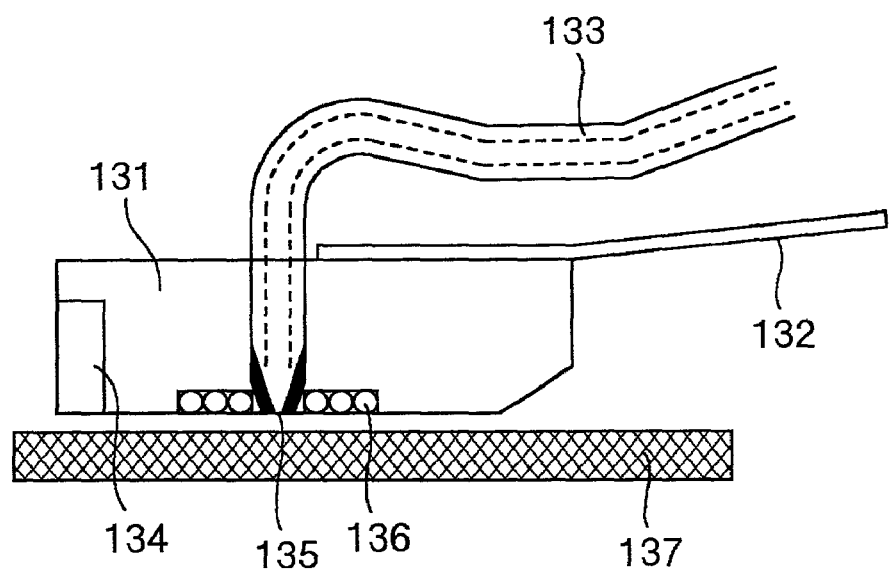
FIG. 13 is a view showing a slider according to a third embodiment, on which slider both thermo-magnetic recording head and magnetic flux reproducing head are mounted.

Another Embodiment 3 of the present invention, on which a magnetic flux detecting device and heating means are mounted on the same slider, is shown in FIG. 13. A floating slider 131 is supported on a forward end of a swing arm via a suspension 132. A magnetic flux detecting device 134 is mounted in a rear end in the proceeding direction of the floating slider (rightward in FIG. 13). In addition, an optical fiber 133 for light guiding is incorporated so as to pierce the slider from the opposite side of the floating surface. A forward end of the optical fiber 133 is covered with a metal reflection film, and moreover, an optically transparent pin hole 135 is formed to be aligned with the center part of the optical fiber core of the slider's bottom. The light led by the optical fiber 133 is transmitted through the pin hole portion 135 to heat the recording medium 137. In addition, in order to apply the recording magnetic field in the vicinity of this heated region, a magnetic coil 136 was incorporated in the circumference of the pin hole 135.

Figure 14:
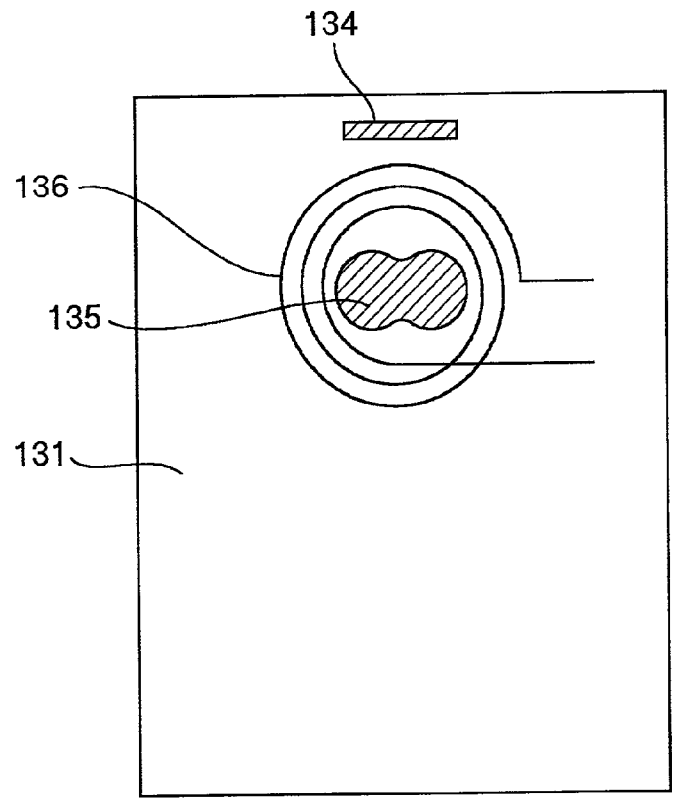
FIG. 14 is a view showing a positional relationship between the magnetic flux detecting element and an optical probe minute opening on the slider of FIG. 13.

FIG. 14 shows a part of the bottom of the floating slider of the present Embodiment 3. Since the pinhole 135 is formed to have the common longitudinal direction with the magnetic flux detecting device 134, the magnetic wall direction of the magnetic domain recorded by this heating means in the thermo-magnetic recording is made approximately in accord with the said magnetic flux detecting means. Accordingly, due to the reasons as in Embodiments 1 and 2, the recording/reproducing characteristics can be improved over the whole surface of the recording medium. In addition, with the mix mounting head as shown in the present Embodiment 3, a large-scale mechanical device for making shapes of the heated region and the magnetic flux detecting device in accord with each other will become unnecessary, which is extremely advantageous in cost.

Embodiment 4

Figure 18:
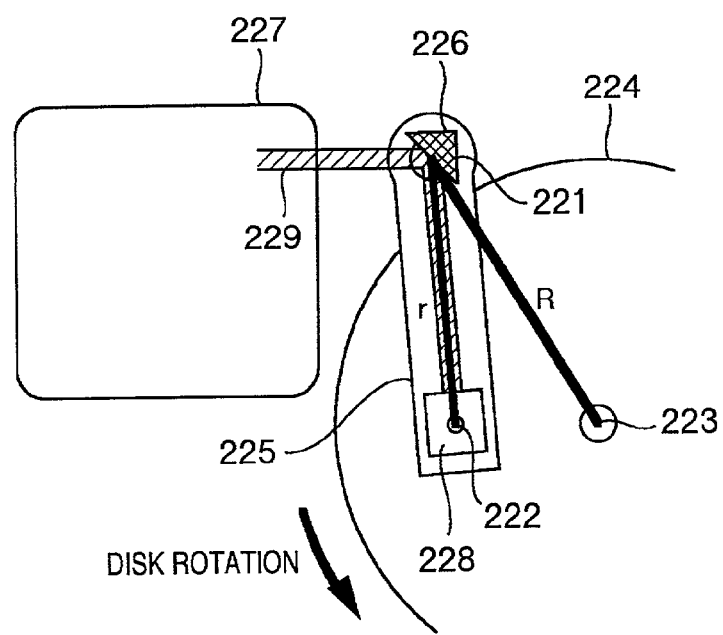
FIG. 18 is a view showing a mother substrate exposure apparatus according to a fourth embodiment.

Next, as the present Embodiment 4, a method of producing an information recording medium suitable for the apparatus for recording/reproducing information of the present invention will be described. For producing the master disk, the laser cutting process used for producing masters of normal optical disks was used. Photoresist is applied onto a glass plate, a laser is irradiated directly with an exposing apparatus shown in FIG. 18, and a development is performed to concave parts. When the laser is irradiated, its spot is conveyed sequentially from inside to outside or from outside to inside, and as this conveying mechanism in the present embodiment a mechanism in a swing arm shape as shown in FIG. 18 was used. This swing arm is designed to have the same geometrical arrangement of the optical system as the optical arrangement of the apparatus for recording/reproducing information shown in FIG. 10, regarding the distance "r" from the arm rotation shaft 221 to the spot condensing position 222 and the distance "R" between the arm rotation shaft 221 and the master disk rotation shaft 223 etc. The fixed optical system 227 of the master exposing apparatus in FIG. 18 comprises an AO deflector for changing the direction of the beam by a micro angle, in addition to a krypton laser light source with wavelength of 351 nm, an AO modulator for light intensity modulation, optical components such as mirrors and lenses. The AO deflector modulates the light spot locations in perpendicular to the track orientation (that is, in the radius direction of the disk), and as the master exposing apparatus comprising the AO deflector like this, there are various proposals from the past as in, for example, JP-A-7-169115 specification. A single or a plurality of laser beam(s) modulated in intensity and direction by the fixed optical system 227 passes the optical path 229 and the movable optical system 228 to be focused onto the photoresist face applied onto the master. In addition, a numerical aperture of the objective lens attached to the movable portion of the optical system is 0.9, and the radius of the light spots formed onto the photoresist of the master is reduced to about 30% in both longitudinal and transversing directions compared with the apparatus for recording/reproducing information in FIG. 10.

Figure 19:
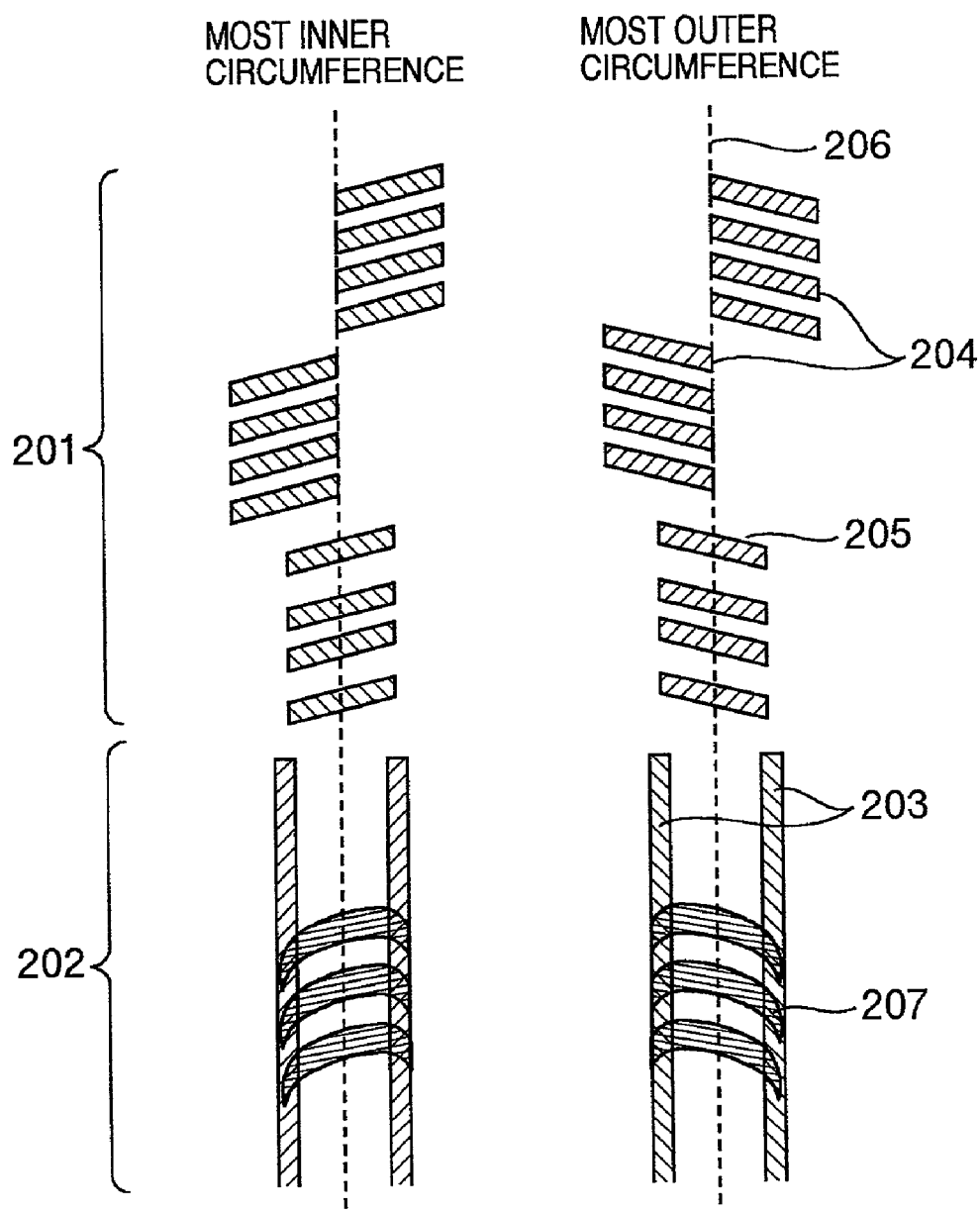
FIG. 19 is a view showing a magnetic disk medium with information pits formed by the mother substrate exposure apparatus according to the fourth embodiment.

The AO deflector of the present apparatus modulates the light beam direction in parallel to the rotation face of the swing arm. Accordingly, the light spot is modulated in a transverse direction with respect to the swing arm direction to form transversely elongated information pit, then the longitudinal direction of that pit will not always be perpendicular to the track orientation, and the direction of inclination of the information pit will change according to the radial position of the track. As a result of producing a master disk with the above described master exposing apparatus, as shown in FIG. 19, a master disk with the information pits whose longitudinal directions were different in the inner circumference and outer circumference from the direction perpendicular to the track was obtained. The surface projection and recess of this information recording medium was formed with information pits including the servo pits 204, address/clock pits 205 and ROM pits etc. and guard band grooves 203 formed in the both sides of the data region. The guard band grooves 203 disposed in the both sides of the recordable region were formed by irradiation of a single circular micro light spot.

Next, the disk substrate was produced from the thus produced master disk, a sample disk was produced by filming a thermomagnetic recording film thereon, and the recording and reproducing experiment was executed. The recording and reproducing experiment was executed on the recording/reproducing apparatus of the Embodiment 2 as shown in FIG. 10 and FIG. 11. In this recording/reproducing apparatus, since the distance "r" from the swing arm rotation shaft of the magnetic flux detecting device to the spot focusing location and the distance "R" between the said swing arm rotation axis and the disk rotation axis are the same as those in the master disk producing apparatus of the present embodiment as described above, the longitudinal direction of the information pit corresponds to changes in longitudinal direction of the magnetic flux detecting device in respective radial position. In addition, as shown in FIG. 19, inclination of the heated region by the recording means of the said recording/reproducing apparatus, that is, the magnetic wall direction of the recorded magnetic domain 207 was sufficiently in accord with the longitudinal directions of the information pits 204 and 205. Accordingly, with this medium, high density recording and reproducing operation can be executed while both the information pits and the recorded data are reproduced with high resolution capability with the same magnetic flux detecting device over the whole region of the disk and highly accurate tracking is executed with signals from the information pits.

As described above, by using the medium producing method as Embodiment 4, an information recording medium on which the longitudinal axis directions of the information pits 204 and 205 appropriately change with respect to the direction perpendicular to the track axis 206 can be produced from the inner circumference to the outer circumference of the disk. Since the laser cutting of the information recording medium was performed in Embodiment 4 with the optical system of the same geometrical arrangement as the recording/reproducing information apparatus of Embodiment 2, a surface recess and projection shape appropriate for use in the recording/reproducing information apparatus of Embodiment 2 could be obtained. By designing the optical system of the master disk exposing apparatus with taking the arrangement of the actually used recording/reproducing information apparatus, an information recording medium appropriate for different recording/reproducing information apparatuses is obtainable.

In addition, in Embodiment 4, the production of master disk by way of laser cutting was described, but the information recording medium of the present invention can be produced by way of cutting process with electron beam and lithography process with contact exposure or reduction projection exposure.

INDUSTRIAL APPLICABILITY

As obvious from the above descriptions in the above, with the information recording/reproducing information apparatus and the information recording medium according to the present invention, the inclination of the magnetic flux detecting device with respect to the track is made over the whole range of the recording medium in accord with the inclination of the recorded magnetic domain by the system of magnetic field modulation thermo-magnetic recording, and thus reproduction with high resolution capability will become feasible. Consequently, it will become possible to increase the recording capacity per one recording medium and high density storage system can be realized.

The invention claimed is:

1. An information recording and reproducing apparatus for recording information by forming an information pit determined by a magnetic domain on a track in a magnetic recording disk, said information pit being formed by applying a magnetic recording field and heating a certain portion of the track, comprising:
    means for heating the information pit by generating a heated area on the track;
    a magnetic head for applying the magnetic field to the information pit and for sensing the information pit on the track;
    a swing arm for holding and positioning the magnetic head to desired portions on the track; and
    said magnetic head including a magnetic flux detecting means,
    means for controlling an orientation of a non-circular shape of the heated area with respect to the track according to a radial position on the disk by generating a two-headed spot on the track so that the orientation is coincident with a longitudinal direction of the magnetic flux detecting means according to the track.

2. An information recording and reproducing apparatus according to claim 1, further comprising:
    a second swing arm for holding and positioning the means for beating the information pit to a predetermined portion on the track.

3. An information recording and reproducing apparatus according to claim 1, wherein said means for heating the information pit further comprises:
    an optical device for forming a light spot on the track.

4. An information recording and reproducing apparatus according to claim 2, wherein a distance between a rotational axis of the swing arm and a rotational axis of the disk and a distance between a rotational axis of the second swing arm and the rotational axis of the disk is substantially the same, and a distance between the magnetic flux detecting means and the rotational axis of the swing arm and a distance between the means for heating the information pit and the rotational axis of the second swing arm is substantially the same.

5. An information recording and reproducing apparatus according to claim 1, wherein the means for controlling the shape of the heated area controls the shape of the heated area to be non-circular such that the orientation of the shape of the heated area with respect to the track changes from an innermost circumference to an outermost circumference of the disk.

* * * * *

UNITED STATES PATENT AND TRADEMARK OFFICE
CERTIFICATE OF CORRECTION

PATENT NO. : 7,688,685 B1　　　　　　　　　　　　　　　　　　　　　　Page 1 of 1
APPLICATION NO. : 10/069732
DATED : March 30, 2010
INVENTOR(S) : H. Nemoto et al.

It is certified that error appears in the above-identified patent and that said Letters Patent is hereby corrected as shown below:

ON THE TITLE PAGE

Please correct (86) PCT No.: to read as follows:

(86) PCT No.:　　PCT/JP00/01200

§371(c)(1),
(2), (4) Date:　Feb. 26̶28, 2002

Signed and Sealed this

Eighth Day of June, 2010

David J. Kappos
*Director of the United States Patent and Trademark Office*